(12) United States Patent
Gurin (10) Patent No.: US 9,249,018 B2
(45) Date of Patent: Feb. 2, 2016

(54) HYBRID SUPERCRITICAL POWER CYCLE HAVING LIQUID FUEL REACTOR CONVERTING BIOMASS AND METHANOL, GAS TURBINE POWER GENERATOR, AND SUPERHEATED CO2 BYPRODUCT

(76) Inventor: Michael Gurin, Glenview, IL (US)

( * ) Notice: Subject to any disclaimer, the term of this patent is extended or adjusted under 35 U.S.C. 154(b) by 1002 days.

(21) Appl. No.: 13/355,562

(22) Filed: Jan. 22, 2012

(65) Prior Publication Data

US 2012/0186219 A1 Jul. 26, 2012

Related U.S. Application Data

(60) Provisional application No. 61/435,348, filed on Jan. 23, 2011.

(51) Int. Cl.
| | |
|---|---|
| *C01B 3/22* | (2006.01) |
| *C10G 3/00* | (2006.01) |
| *F02C 6/04* | (2006.01) |
| *F02C 6/18* | (2006.01) |
| *F01K 25/10* | (2006.01) |

(52) U.S. Cl.
CPC ... *C01B 3/22* (2013.01); *C10G 3/42* (2013.01); *F02C 6/04* (2013.01); *F02C 6/18* (2013.01); *C01B 2203/1223* (2013.01); *C01B 2203/1258* (2013.01); *C01B 2203/82* (2013.01); *C10G 2300/1011* (2013.01); *F01K 25/103* (2013.01); *Y02E 20/18* (2013.01); *Y02E 50/12* (2013.01); *Y02P 20/129* (2015.11); *Y02P 20/544* (2015.11); *Y02P 30/20* (2015.11)

(58) Field of Classification Search
CPC ............ F01K 23/02; F01K 3/00; F01K 3/12; F01K 25/103; F02C 1/05; F02C 6/18; F02C 6/04; F02C 6/10; C01B 3/22; C01B 2203/1223; C01B 2203/80; C01B 2203/86; C01B 2203/0238; C01B 2203/82; C01B 2203/0222; C01B 2203/1258; C01B 2203/84; C10G 3/42; C10G 2300/1011; C10G 3/50; C10G 3/52; C10G 2300/1014; C10G 2300/1018; C10G 1/00; C10G 1/002; C10G 1/008; C10G 3/00; Y02E 50/10–50/18; Y02C 10/00; Y02C 10/12; C07C 1/20; C07C 1/2076; C07C 1/2078; C07C 9/04
USPC .......... 60/39.52, 39.5, 659, 645; 44/605, 606; 585/702, 733, 240–242

See application file for complete search history.

(56) References Cited

U.S. PATENT DOCUMENTS

| | | | |
|---|---|---|---|
| 3,971,211 A * | 7/1976 | Wethe et al. ................ | 60/39.181 |
| 4,086,877 A * | 5/1978 | Henkel ................... | F02M 27/02 123/1 A |
| 4,498,289 A * | 2/1985 | Osgerby ...................... | 60/39.52 |
| 5,512,599 A * | 4/1996 | Hiramatsu .............. | C01B 3/382 518/703 |
| 5,827,496 A * | 10/1998 | Lyon ..................... | F01N 3/2006 165/104.11 |
| 6,159,434 A * | 12/2000 | Gonjo ................... | B01J 10/007 422/200 |
| 7,937,948 B2 * | 5/2011 | Zubrin et al. ................... | 60/780 |
| 2002/0182460 A1 * | 12/2002 | Okamoto ............ | H01M 8/0612 429/436 |
| 2009/0038314 A1 * | 2/2009 | Pearson .................... | F02C 6/10 60/781 |
| 2009/0038316 A1 * | 2/2009 | Pearson .................... | C07C 1/24 60/784 |
| 2009/0084666 A1 * | 4/2009 | Agrawal ................ | C10B 49/22 201/2.5 |
| 2010/0257868 A1 * | 10/2010 | Craze ......................... | C10J 3/00 60/780 |

(Continued)

Primary Examiner — Phutthiwat Wongwian
Assistant Examiner — Alain Chau (57) ABSTRACT

A power generation system yielding exhaust providing both carbon dioxide and a preheated hydrogen source used to create liquid fuels from the reaction of the now heated hydrogen with cellulosic biomass, preferably where the hydrogen source is methanol.

8 Claims, 4 Drawing Sheets

(56) References Cited

U.S. PATENT DOCUMENTS

| | | | | |
|---|---|---|---|---|
| 2011/0065814 A1* | 3/2011 | Matson | .................... | C01B 3/22 518/702 |
| 2011/0209387 A1* | 9/2011 | Humphreys | .............. | C10L 1/02 44/307 |
| 2012/0032452 A1* | 2/2012 | Kuku | ...................... | C01B 3/342 290/1 R |

* cited by examiner

HYBRID SUPERCRITICAL POWER CYCLE HAVING LIQUID FUEL REACTOR CONVERTING BIOMASS AND METHANOL, GAS TURBINE POWER GENERATOR, AND SUPERHEATED CO2 BYPRODUCT

FIELD OF THE INVENTION

The present invention generally relates to power generation with a secondary source of carbon dioxide from either process byproducts or combustion exhaust. In all embodiments, the present invention utilizes at least one power generating cycle producing CO2 containing emissions and with at least one power generating cycle using supercritical carbon dioxide "ScCO2" as a working fluid.

BACKGROUND OF THE INVENTION

Energy efficiency has important impact on both economics of operating costs and carbon dioxide "CO2" emissions. The production of fuels from biomass often has byproducts consisting of carbon dioxide, and in most cases the carbon dioxide is at an exergy level sufficient to yield power generation. One such source of carbon dioxide is the catalytic conversion of cellulosic biomass into liquid and/or gaseous fuels. Another source of carbon dioxide is the combustion exhaust of high temperature industrial processes and/or power generation cycles (a.k.a. top cycle).

Traditional power generation cycles using supercritical carbon dioxide "ScCO2" have distinct challenges associated with at least one of CO2 leakage from the otherwise closed loop cycle, and the direct impact of CO2 within the high pressure side of the closed loop cycle on the low pressure side of the closed loop cycle and vice versa.

The combined limitations of each individual component being the operation of power generation cycles using ScCO2 as a bottom cycle to a top cycle power generation cycle that has both waste heat and CO2 emissions.

SUMMARY OF THE INVENTION

The present invention preferred embodiment relates to the decoupling of the high pressure side of a waste heat driven power generation cycle from the low pressure side. The utilization of a high pressure side storage system and a low pressure side storage system combined with an onsite CO2 source resulting directly from either combustion exhaust or secondary process byproduct. The onsite CO2 source enables the high pressure side "high-side" to have its ScCO2 working fluid to be sourced from either or both the high-side storage tank as a buffered CO2 source (in part or entirely such as in a compressed air energy storage), or entirely/in part from pressure increasing device (e.g., turbocompressor, turbopump, compressor, or pump) having its source of the low pressure side "low-side" of the ScCO2 power generating cycle. The ability to vent CO2 from either or both the high-side and low-side at any point of operation is physically enabled, but more importantly economically enabled by utilizing CO2 from the secondary process.

DETAILED DESCRIPTION OF THE INVENTION

The term "in thermal continuity" or "thermal communication", as used herein, includes the direct connection between the heat source and the heat sink whether or not a thermal interface material is used.

The term "fluid inlet" or "fluid inlet header", as used herein, includes the portion of a heat exchanger where the fluid flows into the heat exchanger.

The term "fluid discharge", as used herein, includes the portion of a heat exchanger where the fluid exits the heat exchanger.

The term "expandable fluid", as used herein, includes the all fluids that have a decreasing density at increasing temperature at a specific pressure of at least a 0.1% decrease in density per degree C.

The term "working fluid" is a liquid medium utilized to convey thermal energy from one location to another. The terms heat transfer fluid, working fluid, and expandable fluid are used interchangeably.

The term "supercritical" is defined as a state point (i.e., pressure and temperature) in which a working fluid is above its critical point. It is understood within the context of this invention that the working fluid is supercritical at least on the high side pressure of a thermodynamic cycle, and not necessarily on the low side of the thermodynamic cycle.

The term "ramjet" is a rotary device that eliminates the need for a conventional bladed compressor (when a ramjet compressor) and turbine (when a ramjet expander) as used in traditional gas turbine engines. One embodiment of a ramjet is an inside-out supersonic circumferential rotor having integrated varying-area shaped channels in its radially inward surface, in which compression, combustion and expansion occur. The "inside-out" design places all rotating parts under compressive centrifugal loading.

The term "top cycle" is a power conversion cycle at the highest exergy state (i.e., having the maximum ability to produce useful work, also synonymous with topping cycle.

The term "CO2 source" is an air composition that contains carbon dioxide ranging from 5 percent on a mass fraction basis to a highly enriched air composition up to 100 percent on a mass fraction basis.

The term "fuel" is a chemical reactant that is exothermic during an oxidation reaction.

The term "CO2 capture system" is a method of effectively isolating carbon dioxide from an air composition, such as combustion exhaust, by any method ranging from carbonation chemical reaction, adsorption, or absorption. The process of isolating carbon dioxide is reversible such that an increase of temperature beyond a critical point changes the equilibrium point.

The term "recuperator" is a method of recovering waste heat downstream of an expander and transferring the thermal energy upstream of either a compressor, turbocompressor or pump.

The term "exhaust port" is any method capable of discharging a working fluid that can include safety valve, pressure regulated valve, expansion device venting to atmosphere, etc.

The term "pressure increasing device" is any device capable of increasing the pressure of a working fluid, include a turbocompressor, turbopump, compressor, or pump.

The term "high-side" is the high pressure side of a closed loop thermodynamic cycle such that the high-side is downstream of a pressure increasing device and upstream of an expander device.

The term "low-side" is the low pressure side of a closed loop thermodynamic cycle such that the low-side is downstream of an expander device and upstream of a pressure increasing device.

Here, as well as elsewhere in the specification and claims, individual numerical values and/or individual range limits can be combined to form non-disclosed ranges.

Exemplary embodiments of the present invention will now be discussed with reference to the attached Figures. Such embodiments are merely exemplary in nature. Furthermore, it is understand as known in the art that sensors to measure thermophysical properties including temperature and pressure are placed throughout the embodiments as known in the art, most notably positioned to measure at least one thermophysical parameter for at least one thermodynamic state point. The utilization of valves as standard mass flow regulators is assumed (i.e., not depicted) to be as known in the art and can also include variable flow devices, expansion valve, turboexpander, two way or three way valves. The utilization of methods to remove heat from the working fluid by a condensor (used interchangeably with condenser) is merely exemplary in nature as a thermal sink and can be substituted by any device having a temperature lower than the working fluid temperature including absorption heat pump desorber/generator, liquid desiccant dehumidifier, process boilers, process superheater, and domestic hot water. With regard to FIGS. 1 through 4, like reference numerals refer to like parts.

It is understood that virtually every embodiment of this invention can include CO2 sources such as calciners, high temperature furnaces, and fuel combustors.

Every configuration and embodiment has a control system and method of control to operate the power generation cycle(s) and to obtain optimal control of a combined ScCO2 cycle and a secondary cycle that yields at least CO2 and preferably also yields waste heat as a byproduct.

Figure 1:
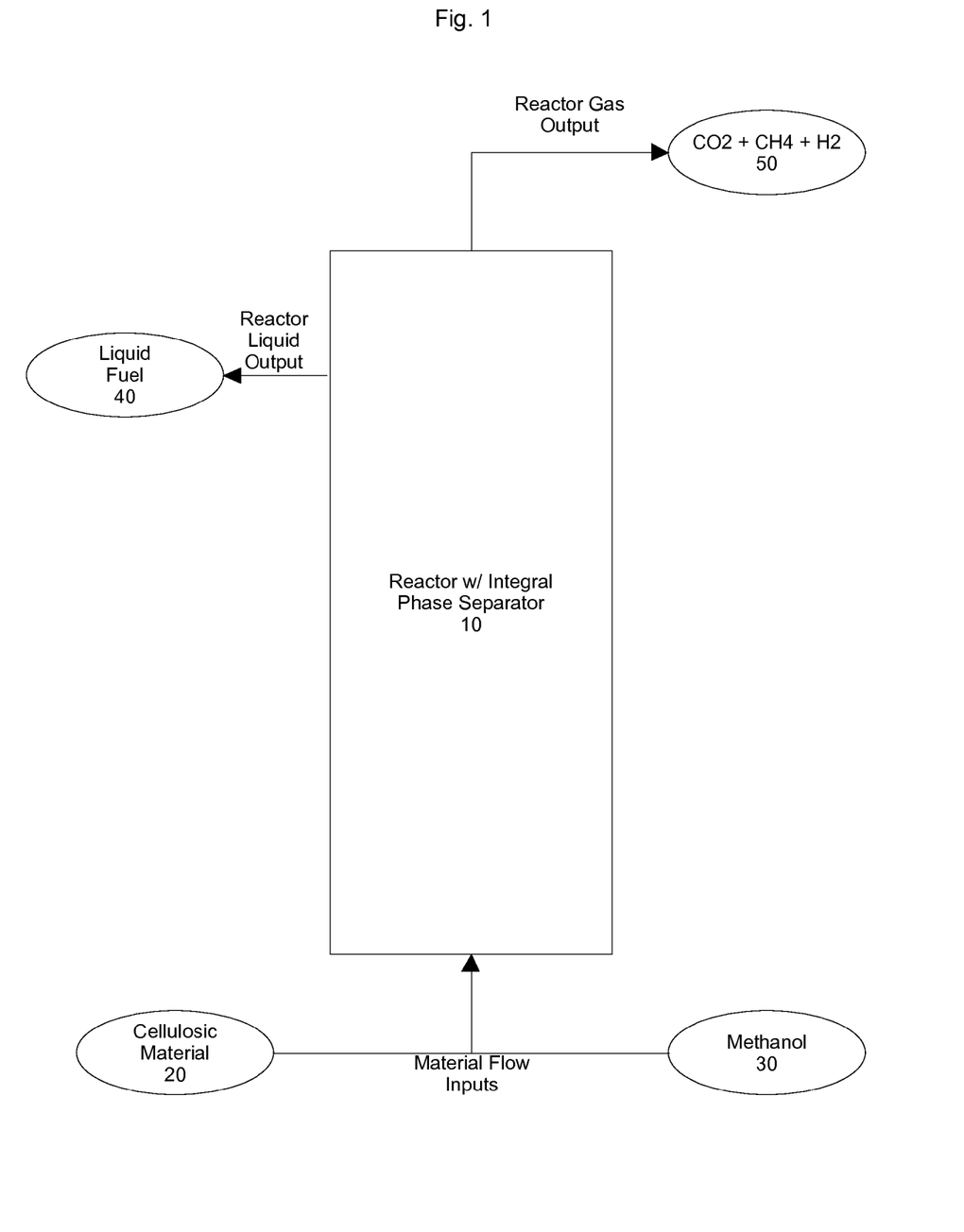
FIG. 1 is a sequential flow diagram of one embodiment of a secondary process that is a biomass to biofuel converter yielding CO2 and waste heat in accordance with the present invention.

Turning to FIG. 1, FIG. 1 is a sequential flow diagram of one embodiment of a supercritical CO2 source in accordance with the present invention. The ScCO2 as depicted here is from the reaction of biomass at conditions in excess of 100 degrees Celsius (preferably above 150 Celsius, and particularly preferable above 200 Celsius) and pressures above the supercritical pressure of CO2 (preferably above 1500 psi, particularly preferable above 2000 psi, and specifically preferred above 2500 psi). The preferred reaction yields CO2, such as the cellulosic breakdown using catalysts into liquid fuels. Typical catalytic reactions will also yield methane and hydrogen as byproducts. The reactor 10 is preferably configured with an integral phase separator, such that at least CO2 is removed at a controlled rate to both vary the biomass solution pH and to increase interaction between the cellulose and the desired reactant(s). The liquid fuel has a higher density than the ScCO2, as well as other byproducts including methane and hydrogen, thus the non-condensable gases (i.e., in supercritical state) at these conditions will bubble to the top of the reactor 10. The particularly preferred reactant with the cellulose material 20 is methanol 30, which are either mixed with the cellulosic material 20 prior to the reactor 10 or in-situ within the reactor 10. Though not depicted in FIG. 1, the cellulosic material 20 is preferably preheated by utilizing the ScCO2 as removed from the reactor 10. The utilization of biomass as depicted in FIG. 1 can be substituted by virtually any CO2 source, such as a calciner utilized for the manufacturing of cement. Yet another alternative is the CO2 produced by biomass fermentation.

Figure 2:
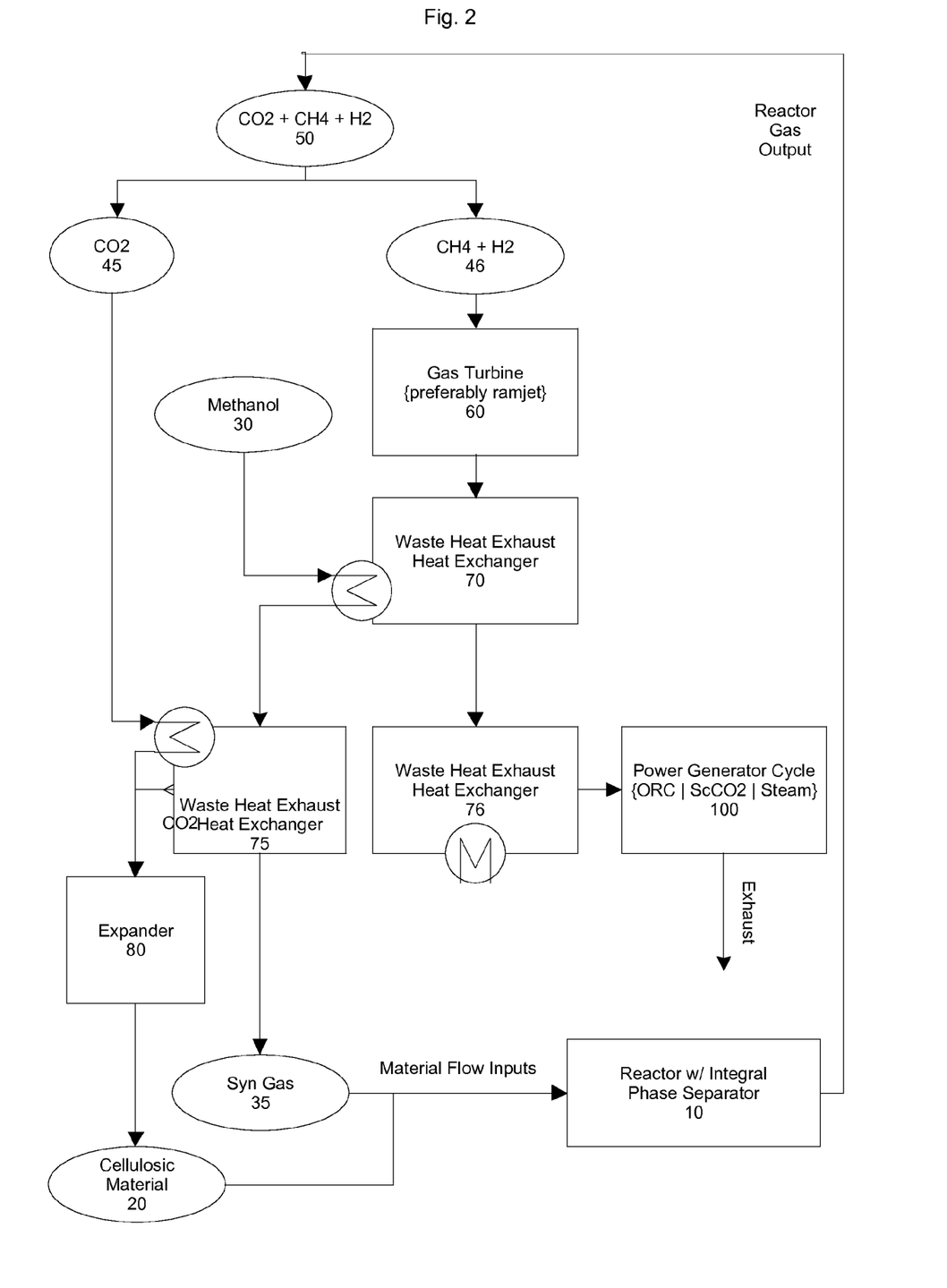
FIG. 2 is a sequential flow diagram of another embodiment of a secondary process that is a biomass to biofuel converter yielding CO2 and waste heat in accordance with the present invention.

Turning to FIG. 2, FIG. 2 is a sequential flow diagram of further embodiments of FIG. 1 in accordance with the present invention. The ScCO2 is further fractionated from the other gases 46 (i.e., including methane CH4 and hydrogen H2). The other gases 46, which can also be fractionated between the CH4 and H2 as desired), are utilized within a power generator such as a gas turbine 60. The gas turbine 60 is preferably a ramjet, as known in the art, capable of accepting a relatively low calorific fuel of at least one of CH4 and H2. The waste heat from the gas turbine 60 is transferred through the waste heat exhaust heat exchanger 70 to the methanol 30 reactant in the preferred embodiment. The utilization of waste heat, preferably above 400 degrees Celsius (and particularly above 600 degrees Celsius, and specifically above 800 degrees Celsius) enables the methanol to disassociate into syngas 35 (as known in the art). The disassociation reaction is an endothermic reaction, thus enabling the preferred separation of the endothermic reaction from the subsequent exothermic reaction of cellulose disassociation. Remaining unutilized waste not transferred into the methanol 30 is then transferred through a second waste heat exhaust heat exchanger 76 into a second power generator cycle 100 (as known in the art to include Organic Rankine Cycle "ORC", Supercritical CO2 "ScCO2" Rankine or Brayton Cycles, or steam simple to combined cycle). It is understood that the order of heat exchangers 70 and 76 can be altered in the event that the methanol disassociation is not desired prior to entry of the reactor 10 or if the disassociation temperature of methanol is substantially reduced through enhanced catalytic performance. The enhanced catalytic performance would enable higher exergy efficiency to be achieved by expanding the working fluid (and producing power) of the power generator cycle 100 prior to transferring thermal energy to the methanol 30, such that the waste heat from the power generator cycle 100 would be subsequently transferred to methanol 30 in lieu of heat exchanger 70. Once the methanol 30 is disassociated by waste heat transferred by the heat exchanger 70, the now syngas is quenched by transferring thermal energy into the supercritical CO2 45 as a method of superheating through the waste heat exhaust heat exchanger 75. The now superheated CO2 45 is expanded through an expander 80 (as known in the art to include centrifugal, radial, axial, or impulse turbines) to produce power (e.g., mechanical energy or electricity). The now expanded CO2 is preferably passed through the cellulosic material 20, more specifically preferred in a counter-flow arrangement, so as to preheat the cellulosic material prior to entering the reactor 10. The now preheated cellulosic material 20 and syngas 35 requires less energy within the reactor 10, thus enabling the exothermic energy from the cellulosic reaction will not be consumed (or at least less so) within the reactor thus making this thermal energy available for additional waste heat recovery power generation cycles or preheat of other raw materials.

Figure 3:
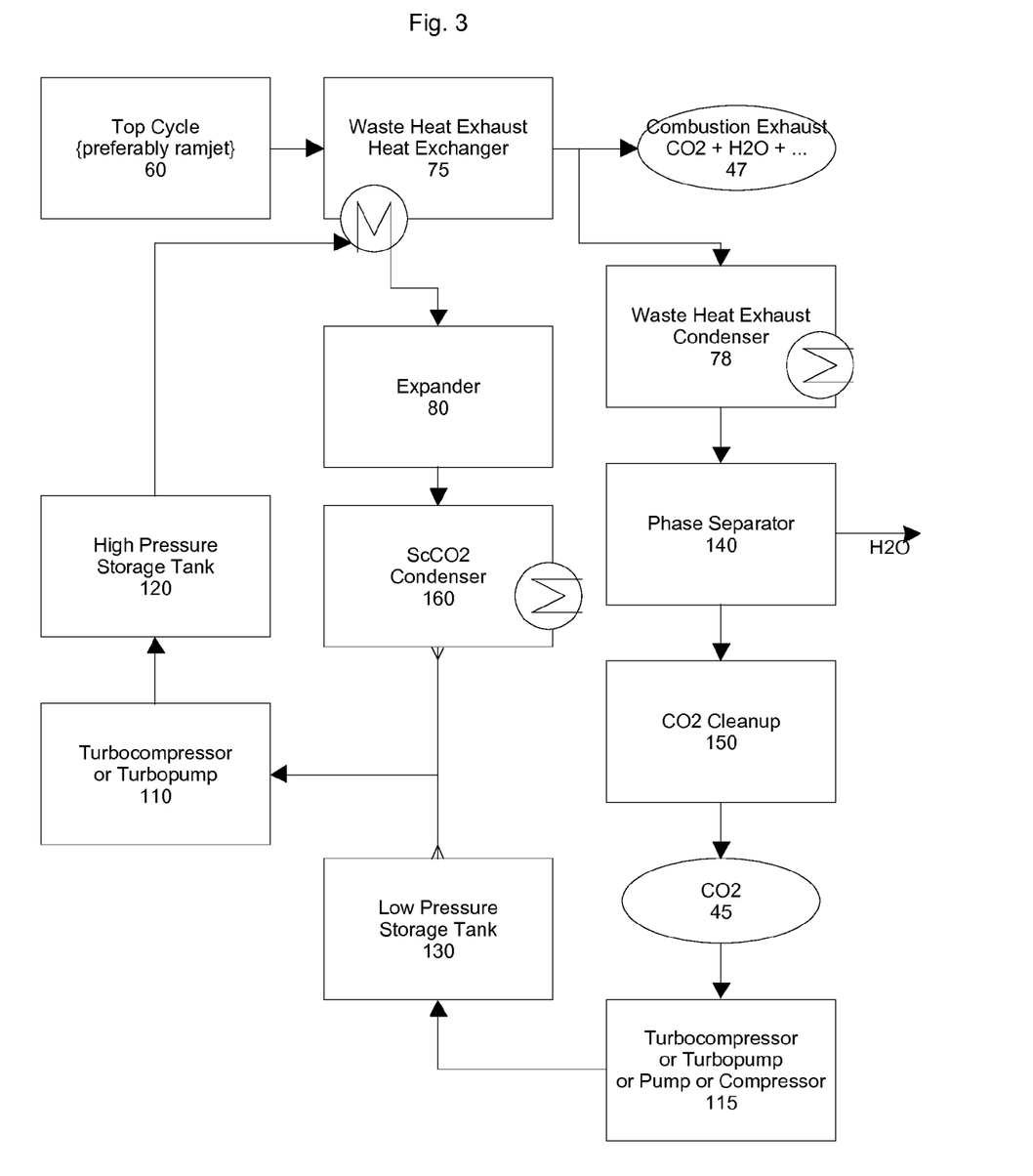
FIG. 3 is a sequential flow diagram of one embodiment of a decoupled high-side from low-side within a waste heat power generation CO2 cycle, with both CO2 and waste heat coupling between a secondary cycle and the waste heat power generation CO2 cycle.

Turning to FIG. 3, FIG. 3 is a sequential flow diagram of one embodiment of a hybrid supercritical CO2 power generation cycle with high-side and low-side decoupling in accordance with the present invention. The decoupled system as depicted in this FIG. 3 obtains CO2 from the same cycle in which it obtains waste heat. This as shown is from a top cycle 60, which is preferably a ramjet or other gas turbine. The combustion exhaust from the top cycle transfers thermal energy to the ScCO2 decoupled cycle through the waste heat exhaust heat exchanger 75, as known in the art, to the high-side of the ScCO2 thermodynamic cycle (downstream of the high pressure storage tank 120, and upstream of the expander 80). The preferred embodiment has the temperature of the waste heat downstream of the heat exchanger 75 such that the water vapor condenses at this state point. In the event that the water vapor is not condensed, a method of control with a valve (not shown in the Figure) is used such that only a slipstream of the waste heat exhaust is transferred to a second waste heat exchanger that serves as a waste heat exhaust condenser 78. The balance of the non-utilized waste exhaust, which contains CO2, H2O and other non-condensable gases 47 is vented to the atmosphere. In the event that the pressure downstream of the heat exchanger 75 is sufficiently higher than ambient pressure, it is understood that an additional expander can be utilized to further generate power. The waste heat slipstream downstream of the exhaust condenser 78 enters the phase separator 140 to isolate the CO2 from other gases and condensables prior to entering the CO2 cleanup 150 (as known in the art to include membrane separators, adsorption or absorption processes, mineral carbonation with reversibility, etc.) and finally discharging CO2 45 having at least 90% purity on a weight basis (and preferably above 95% purity, and specifically preferred to have over 99% purity). A small pressurizing device 115, such as a turbocompressor, compressor, pump or turbopump raises the CO2 45 to a pressure of at least 1 psi above the pressure of the low pressure storage tank 130. The on-demand availability of CO2 45 originating from combustion exhaust enables the high-side pressure operations to be independent of the low-side pressure operations, at least to the degree that the expander 80 discharge pressure can operate at a pressure of at least 1 psi above or below the pressure of the low-side pressure (i.e., upstream of the ScCO2 condenser 160. The preferred operation of the high-side pressure as compared to the low-side pressure (again downstream of the expander 80 relative to upstream of the condenser 160) is asynchronous, specifically meaning that the mass flow rate of the high-side is different than the low-side by at least 1 percent (preferably at least 5 percent, and specifically preferred at least 10 percent particularly during transition periods of operation e.g., start-up, shut-down, weather changes, altitude changes, etc.). The low pressure storage tank 130 has valves to regulate mass flow into and out of the tank 130 as known in the art, such that fluid within the tank is preferably entering the tank 130 at a relatively cooler temperature (i.e., as depicted to be downstream of the condenser 160). It is understood that the CO2 45 from downstream of the pressurizing device 115 can enter the low pressure storage tank 130 either prior to entering the condenser 160 or after the condenser 160 (as shown in this FIG. 3). The low-side mass flow rate is regulated independently of the high-side mass flow rate by a method of control ranging from mass flow rate of waste heat exhaust slipstream through pressure increase achieved by the pressurizing device 115 in addition to valves. The turbocompressor or turbopump 110 (which can also be compressor or pump) discharges the now supercritical CO2 into the high pressure storage tank 120 as depicted, or alternatively through a bypass of the high pressure storage tank 120. The high pressure storage tank 120 serves to isolate and buffer the mass flow rate, and pressure changes within the high-side from the low-side. The ScCO2 is then discharged through the waste heat exhaust heat exchanger 75 to obtain thermal energy from the top cycle exhaust 60. It is understood that the only method to instantaneously respond to pressure transients within either the high-side or low-side such that neither impacts the other in a synchronous manner is to utilize both the high pressure storage tank 120 and the low pressure storage tank 130 in combination with an on-demand CO2 source from the combustion exhaust. Without the on-demand CO2 source obtaining CO2 that is locally generated, the hybrid ScCO2 cycle is not economically operated. It is also understood that CO2 discharge valves to the ambient environment can be placed downstream of any component within FIG. 3, but for the high-side is optimally located downstream of the high pressure storage tank 120 and upstream of the waste heat exhaust heat exchanger 75; and for the low-side is optimally located downstream of the expander 80 and upstream of the condenser 160.

Figure 4:
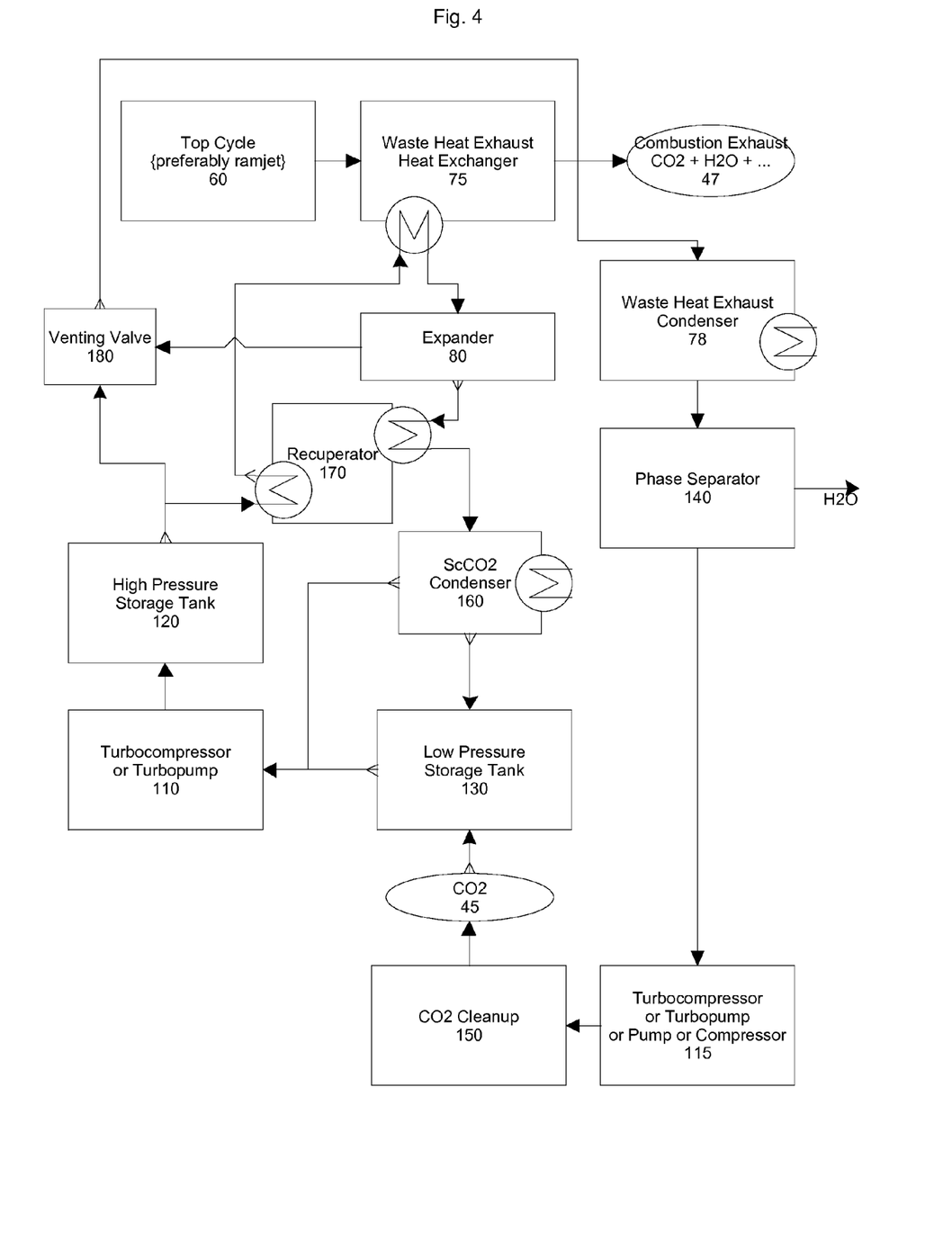
FIG. 4 is a sequential flow diagram of another embodiment of a decoupled high-side from low-side within a waste heat power generation CO2 cycle, with both CO2 and waste heat coupling between a secondary cycle and the waste heat power generation CO2 cycle.

Turning to FIG. 4, FIG. 4 is a sequential flow diagram of another embodiment of a hybrid supercritical CO2 power generation cycle with high-side and low-side decoupling in accordance with the present invention. The primary differences between FIG. 3 and FIG. 4, is that FIG. 4 contains a recuperator 170 and also has the CO2 cleanup 150 downstream of the small pressurizing device 115 (as compared to upstream in FIG. 3). The recuperator 170 transfers thermal energy from downstream of the expander 80 to downstream of the high pressure storage tank 120 (or just downstream of the turbocompressor or turbopump 110, though depicted downstream of the high pressure storage tank 120). The decoupled system as depicted in this FIG. 4 obtains CO2 from the same cycle in which it obtains waste heat. This as shown is from a top cycle 60, which is preferably a ramjet or other gas turbine. The combustion exhaust from the top cycle transfers thermal energy to the ScCO2 decoupled cycle through the waste heat exhaust heat exchanger 75, as known in the art, to the high-side of the ScCO2 thermodynamic cycle (downstream of the high pressure storage tank 120, and upstream of the expander 80). The preferred embodiment has the temperature of the waste heat downstream of the heat exchanger 75 such that the water vapor condenses at this state point. In the event that the water vapor is not condensed, a method of control with a valve (not shown in the Figure) is used such that only a slipstream of the waste heat exhaust is transferred to a second waste heat exchanger that serves as a waste heat exhaust condenser 78. The balance of the non-utilized waste exhaust, which contains CO2, H2O and other non-condensable gases 47 is vented to the atmosphere. In the event that the pressure downstream of the heat exchanger 75 is sufficiently higher than ambient pressure, it is understood that an additional expander can be utilized to further generate power. The waste heat slipstream downstream of the exhaust condenser 78 enters the phase separator 140 to isolate condensable from the CO2 and other gases prior to being pressurized by the small (relative to the pressurizing device 110) pressurizing device 115. At the now higher pressure, the CO2 is separated from nitrogen and un-combusted oxygen. The CO2 is further fractionated by entering the CO2 cleanup 150 (as known in the art to include membrane separators, adsorption or absorption processes, mineral carbonation with reversibility, etc.) and finally discharging CO2 45 having at least 90% purity on a weight basis (and preferably above 95% purity, and specifically preferred to have over 99% purity). The small pressurizing device 115, such as a turbocompressor, compressor, pump or turbopump raises the CO2 45 to a pressure of at least 1 psi above the pressure of the low pressure storage tank 130. The on-demand availability of CO2 45 originating from combustion exhaust enables the high-side pressure operations to be independent of the low-side pressure operations, at least to the degree that the expander 80 discharge pressure can operate at a pressure of at least 1 psi above or below the pressure of the low-side pressure (i.e., upstream of the ScCO2 condenser 160. The preferred operation of the high-side pressure as compared to the low-side pressure (again downstream of the expander 80 relative to upstream of the condenser 160) is asynchronous, specifically meaning that the mass flow rate of the high-side is different than the low-side by at least 1 percent (preferably at least 5 percent, and specifically preferred at least 10 percent particularly during transition periods of operation e.g., start-up, shut-down, weather changes, altitude changes, etc.). The low pressure storage tank 130 has valves to regulate mass flow into and out of the tank 130 as known in the art, such that fluid within the tank is preferably entering the tank 130 at a relatively cooler temperature (i.e., as depicted to be downstream of the condenser 160). It is understood that the CO2 45 from downstream of the pressurizing device 115 can enter the low pressure storage tank 130 either prior to entering the condenser 160 or after the condenser 160 (as shown in this FIG. 3). The low-side mass flow rate is regulated independently of the high-side mass flow rate by a method of control ranging from mass flow rate of waste heat exhaust slipstream through pressure increase achieved by the pressurizing device 115 in addition to valves. The turbocompressor or turbopump 110 (which can also be compressor or pump) discharges the now supercritical CO2 into the high pressure storage tank 120 as depicted, or alternatively through a bypass of the high pressure storage tank 120. The high pressure storage tank 120 serves to isolate and buffer the mass flow rate, and pressure changes within the high-side from the low-side. The ScCO2 is then discharged through the waste heat exhaust heat exchanger 75 to obtain thermal energy from the top cycle exhaust 60. It is understood that the only method to instantaneously respond to pressure transients within either the high-side or low-side such that neither impacts the other in a synchronous manner is to utilize both the high pressure storage tank 120 and the low pressure storage tank 130 in combination with an on-demand CO2 source from the combustion exhaust. Without the on-demand CO2 source obtaining CO2 that is locally generated, the hybrid ScCO2 cycle is not economically operated. It is also understood that CO2 discharge valves to the ambient environment can be placed downstream of any component within FIG. 3, but for the high-side is optimally located downstream of the high pressure storage tank 120 and upstream of the waste heat exhaust heat exchanger 75; and for the low-side is optimally located downstream of the expander 80 and upstream of the condenser 160.

The decoupled high-side from low-side virtually eliminates the impact of transients from either side of the thermodynamic cycle from impacting the other. This is a particularly important capability, as the use of just one storage tank fails to achieve the response times required to prevent pump cavitation. As known in the art, each of the storage tanks (120 or 130) can have integrated heat exchangers to increase or decrease the density of the CO2 within the respective storage tank (120 or 130). Additionally, this configuration of two separate storage tanks has the benefit of buffering any undesirable pressure transient to further isolate the pressure transient from reaching/impacting the moving/rotating equipment (110 and/or 80). The further ability to vent CO2 from either side (high-side or low-side) enables response times faster than 5 seconds (preferably faster than 1 second, particularly preferred faster than 0.5 seconds, and specifically preferred faster than 0.1 seconds). A secondary objective of many future power generation systems is to sequester CO2. The preferred embodiment of this invention utilizes CO2 obtained through the sequestration components, as known in the art, to provide the source of CO2. It is also preferred such that venting of CO2 out of either the high-side or low-side is done upstream of the CO2 sequestration system to minimize "free" CO2. The invention as disclosed here greatly reduces the otherwise technical challenge of preventing CO2 leaks through seals, cavitation within pump, turbopump, compressor, or turbocompressor. The ability to vent CO2 leaks to the CO2 sequestration system, and to take a slipstream of the sequestered CO2 to incorporate into the ScCO2 cycle, as disclosed into the low-side pressure. It is understood that venting from the high-side, in the event that the low pressure storage tank 130 has additional capacity, can be direct from the high-side (including from the high pressure storage tank 120) to the low-side (including to the low pressure storage tank 130) that has the benefit of requiring less CO2 from being sequestered and/or isolated from the combustion exhaust.

As disclosed in this invention, it is understood that high-side pressure ranges from 1200 psi to 6000 psi, preferably between 2200 psi to 3500 psi, and specifically preferred between 2700 psi and 3300 psi. The low-side pressure ranges from 100 psi to 1800 psi, preferably between 200 psi to 1000 psi, and particularly preferred between 300 psi to 700 psi. The preferred discharge temperature of the top cycle is at a temperature above 1000 degrees Fahrenheit, particularly preferred above 1500 degrees Fahrenheit, and specifically preferred above 2000 degrees Fahrenheit.

The utilization of a ScCO2 cycle within low temperature environments is particularly desirable (i.e., below temperatures of 0 degrees Celsius) as a relatively low-side pressure of less than 500 psi (and preferably less than 350 psi) enables the CO2 to be in the liquid state. One such low temperature environment is on an airplane, particularly an airplane that flies above 16,000 feet above sea level. The waste heat from the hybrid ScCO2 cycle is preferably discharged through an embedded condenser within the flight surfaces. The heating up of the airflow, for example at the leading edge, enables higher lift to be achieved therefore serving a secondary benefit beyond the removal of waste heat.

The hybrid power generation system increases the energy efficiency of a wide range of energy production systems by utilizing supercritical CO2 as the working fluid. However, the energy production system operates as two decoupled open cycle components in order to reduce and/or eliminate the complexities of operating a supercritical closed loop cycle with a directly coupled high-side and low-side pressure. The present prior art utilizes an inventory management system in an attempt to reduce the impact of transients on either the high-side or low-side on the other. The preferred embodiment is a combined supercritical carbon dioxide thermodynamic power generating cycle such that a first carbon dioxide source concurrently provides thermal energy (at least a part) to produce power. The CO2 source is preferably incorporate into the low-side using a pressurizing device. The pressurizing device is either a turbopump or pump when the CO2 is already in the liquid form, or if the CO2 prior to injection into the low-side will be in the liquid form. Alternatively, if the CO2 will remain in the vapor form, the pressurized device is either a turbocompressor or compressor. The particularly preferred source of CO2 is from a co-located or directly integrated biomass to biofuel process. Numerous biomass to biofuel processes, such as fermentation or pyrolysis/gasification yield CO2. The specifically preferred biomass to biofuel process is a catalytic process including catalytic processes at a state point above the supercritical temperature and pressure of CO2. Combustion of fuels, including combustion of resulting biofuels or byproducts of the biomass to biofuel process is another source of CO2. Such byproducts includes hydrogen and methane gas.

Yet another embodiment is where the CO2 source is a top cycle power generating Brayton cycle that concurrently produces waste heat. The preferred integration of the Brayton cycles utilizes the waste heat to first to disassociate an organic molecule (e.g., methane, methanol) into syngas and then to quench the syngas that concurrently superheats CO2 within the hybrid ScCO2 power generating cycle. The Brayton cycle combustor can concurrently produce waste heat for the hybrid ScCO2 power generating cycle and be one of the CO2 sources through the combustion exhaust. The preferred embodiment utilizes a slipstream from the combustion exhaust, which is particularly preferred to be processed to cleanup the CO2 from the other components in the combustion exhaust as known in the art.

Another embodiment incorporates a high pressure storage tank on the high-side, and a low pressure storage tank on the low-side. It can also include at least one CO2 venting device, as known in the art, to at least one of the low pressure storage tank and/or ambient environment. The net result is a full decoupling of the high-side pressure portion from the low-side pressure portion such that transients on either the high-side pressure portion or the low-side pressure portion are asynchronous. The ability to decouple transients by at least 0.1 seconds, preferably 0.5 seconds, particularly preferred 5 seconds, and specifically preferred for at least 20 seconds is sufficient time for virtually all circumstances during the operation of the hybrid ScCO2 cycle through start-up, emergency shut-down, changes in high-side pressure, changes in low-side pressure, and also normal CO2 leakage during normal equilibrium operation. The decoupling also enables an independent mass flow rate of the high-side pressure portion with the mass flow rate of the low-side pressure portion. The differential of the mass flow rates are by at least 0.2 percent, preferably at least 0.5 percent, and particularly preferred by at least 1.0 percent. An on-going differential between the high-side and low-side mass flow rates is sustainable by the direct integration of a CO2 sequestration system, as known in the art, such that limited additional capital equipment is required to provide CO2 to the hybrid ScCO2 power generating cycle. This integral capability enables a venting valve (preferably upstream of the carbon dioxide sequestration system) to be utilized to greatly reduce the impact of transients on an instantaneous basis, one specific feature that a traditional ScCO2 cycle is not capable of. The preferred CO2 sequestration system captures at least 1.0 percent of the top cycle power generating Brayton cycle combustion exhaust. The combination of the aforementioned features and a sophisticated control system regulates the mass flow rate of the low-side pressure portion independently of the mass flow rate of the high-side pressure portion.

It is understood in this invention that a combination of scenarios can be assembled through the use of waste heat exchangers, CO2 sources, and fluid valves such that any of the alternate configurations can be in parallel enabling the ScCO2 cycle power generator to support a wide range of secondary processes or cycles.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. An energy production system comprising a liquid fuel reactor having an operating pressure above a supercritical pressure of methanol wherein the liquid fuel reactor converts a cellulosic biomass with methanol into a liquid fuel and yields a reactor gas output operable to increase an energy efficiency of a combined power generating cycle with the liquid fuel reactor, wherein the power generating cycle is comprised of a gas turbine combusting the reactor gas output and producing a waste heat to preheat methanol upstream of the liquid fuel reactor and wherein the liquid fuel reactor converts the cellulosic biomass and methanol into a liquid fuel and yields a carbon dioxide byproduct, wherein the carbon dioxide byproduct is superheated downstream of the power generating cycle and upstream of the liquid fuel reactor by heat exchange with the preheated methanol.

2. The energy production system according to claim 1 wherein the power generating cycle is further comprised of a supercritical carbon dioxide thermodynamic power generating cycle in thermal communication with the waste heat from the power generating cycle gas turbine.

3. The energy production system according to claim 2 power generating cycle produces a combustion exhaust, and wherein a portion of the combustion exhaust is a carbon dioxide source to the supercritical carbon dioxide thermodynamic power generating cycle.

4. The energy production system according to claim 1 wherein the liquid fuel reactor has a catalyst and wherein the liquid fuel reactor operates above the supercritical temperature and pressure of carbon dioxide.

5. The energy production system according to claim 4 wherein the power generating cycle is a top cycle power generating Brayton cycle that concurrently produces waste heat first to disassociate an organic molecule into syngas as a replacement to the methanol.

6. The energy production system according to claim 5 wherein the top cycle power generating Brayton cycle consumes a fuel that is a byproduct of the liquid fuel reactor.

7. The energy production system according to claim 6 wherein the byproduct of the liquid fuel reactor includes a gas comprising hydrogen and methane.

8. The energy production system according to claim 1 wherein the power generating cycle is further comprised of a steam thermodynamic power generating cycle in a thermal communication with the waste heat from the power generating cycle gas turbine.

* * * * *